June 2, 1959  H. E. ELLERMAN ET AL  2,889,531
COLLECTOR RING ASSEMBLY
Filed Dec. 8, 1955
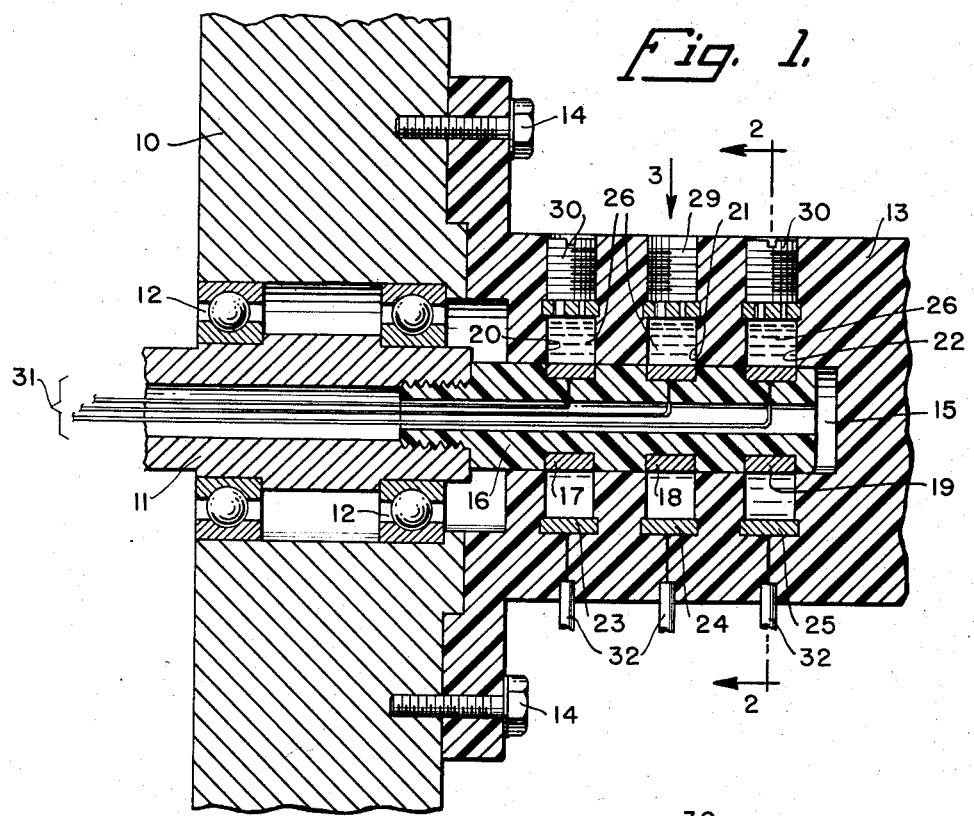
Fig. 1.
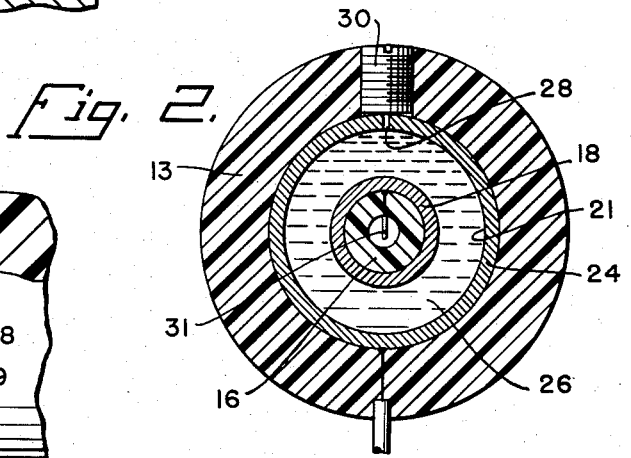
Fig. 2.
Fig. 3.
INVENTORS
HARRY E. ELLERMAN
ROBERT H. KITTLEMAN
BY
ATTORNEYS

2,889,531

COLLECTOR RING ASSEMBLY

Harry E. Ellerman and Robert H. Kittleman, Sharon, Pa., assignors, by mesne assignments, to the United States of America as represented by the Secretary of the Navy Application December 8, 1955, Serial No. 551,968

2 Claims. (Cl. 339—5)

The present invention relates in general to collector ring assemblies, and more particularly to such assemblies in which electrical contact with the collector rings is effected through the medium of a conductive material having fluid characteristics.

Conventional collector ring assemblies, employing carbon or other non-fluid material in the form of brushes or wipers in spring urged contact against collector rings, generally serve admirably in many applications where the usual magnitudes of collector assembly characteristics of frictional restraint and variation of electrical contact resistance can be tolerated. However, certain specialized applications of collector ring assemblies impose requirements that these characteristics be held to extremely low values, as is necessary, for example, in high accuracy free gyroscope devices where sensitive pick-off circuits often require relatively noise-free rotary connections, and where frictional torques about the gimbal axes must be reduced to extremely low values which appear unattainable with conventional assemblies. The two basic characteristics mentioned above are usually at odds in conventional collector ring assemblies, low frictional restraint being obtainable only by reducing brush pressure which is then accompanied by increased variation in electrical contact resistance.

In accordance with the present invention, there is provided a collector ring assembly of novel and practical structure in which the usual combination of collector rings and brushes in spring urged sliding contact therewith is replaced by a pair of spaced collector rings mounted for relative rotational displacement, electrical continuity between collector rings being established by means of a liquid, preferably mercury, having reasonably good conductivity and other concomitant desirable characteristics. The mercury, while having greater resistivity than the non-fluid materials ordinarily employed for brushes in conventional collector ring structures, effects contact around the entire adjacent or facing peripheries of the collector rings and thus achieves at least as low electrical resistance with a considerably better figure of merit as regards variation of resistance during relative rotation of the collector rings.

It is a primary object of the present invention to provide a liquid-contact collector ring assembly having structure which facilitates the introduction or renewal of the conductive liquid in the assembly.

It is another object of the invention to provide such an assembly in which the introduction and retention of a suitable volume of conductive liquid therein can be readily accomplished.

It is a further object of the present invention to provide a liquid contact collector ring assembly which poses no special manufacturing problems and which can be readily assembled and placed in service.

Other objects and many of the attendant advantages of this invention will be readily appreciated as the same become better understood by reference to the following detailed description when considered in connection with the accompanying drawings, wherein:

Fig. 1 is a sectional view taken through the longitudinal axis of the fluid-contact collector ring assembly as mounted upon associated electro-mechanical equipment here shown fragmentarily;

Fig. 2 is a sectional view taken through a filling port on line 2—2 of Fig. 1, and Fig. 3 is a view, partly in section, taken in the direction and in the region of arrow 3 of Fig. 1.

Briefly described, the novel collector ring assembly comprises one or more pairs of concentric inner and outer collector rings mounted in or upon relatively rotatable members which are designed to provide, between each pair of collector rings, an enclosed annular chamber or channel to contain and confine a suitable conductive liquid, preferably mercury, to effect continuous electrical connection between the two relatively rotatable collector rings. One of the collector rings of each pair is provided with apertures to accommodate entry of mercury into the annular channel, and exit of the displaced air, during a filling operation. Access to these apertures is provided by a port in the member carrying the apertured collector ring, the port being adapted to accept a closure or sealing plug.

Referring now to the illustrative embodiment shown in Fig. 1, the electro-mechanical equipment with which the collector ring assembly is associated is shown only to the extent of portions of a frame member 10 and a hollow trunnion 11 journaled in frame member 10 by means of bearings 12. The collector ring assembly per se includes an outer housing member 13, formed of suitable insulating material as later described, secured to frame member 10 by means of screws 14, and having a cylindrical bore 15 designed to snugly accept an inner shaft member 16 for relative rotation therein. Shaft member 16 is threadedly engaged with trunnion 11 as shown for relative rotation therewith, and carries a set of metallic collector rings here shown as three in number as most often required. These collector rings 17, 18 and 19 are carried in annular grooves of inner member 16 as shown in order to yield a shaft structure adapted to be slidably assembled with housing 13. Inner shaft member 16 may be fabricated of the same type of insulating material as housing 13, or of any other material having similar insulating and sliding characteristics as later described.

Referring now to both Figs. 1 and 2, outer housing member 13 is provided with annular recesses or channels 20, 21 and 22 and a set of collector rings 23, 24 and 25 therein which face the collector rings 17, 18 and 19, respectively, so that mercury 26 or other suitable conductive liquid which can be confined in the enclosed channels 20, 21 and 22, will serve to provide electrical connection between rings 17 and 23, 18 and 24, and 19 and 25. Access to the enclosed annular channels for liquid filling and servicing purposes is accommodated by a pair of apertures 27 and 28 in each of the outer collector rings 23, 24 and 25, Fig. 3 illustrating this in a top view, partly in section, for the collector ring 24. Threaded ports 29 are provided in the outer housing member 13 to communicate with the filling apertures as shown and are adapted to be sealed, by means of plugs 30, against loss of the conductive liquid through the apertures which have been used for filling purposes. Removal of a plug 30, for example as indicated in Fig. 1 for the pair of collector rings 18, 24 with which arrow 3 is aligned, enables a filler tube (not shown) to be inserted in the larger of the two apertures in outer collector ring 24, namely aperture 27, through which the conductive liquid may then be fed into the annular channel until it appears at the aperture 28 which serves as an exit for displaced air.

Reinsertion of this plug 30 effectively seals the conductive liquid into confinement in the enclosed channel between the pair of collector rings 18, 24.

External electrical connections to collector rings 17, 18 and 19 are provided by insulated leads 31, and to the collector rings 23, 24 and 25 by insulated leads 32, the bared ends of the leads being individually conductively secured to their respective collector rings by suitable means, for example by soldering as indicated. Outer housing member 13 and inner shaft member 16 are preferably fabricated of a plastic or other suitable material which can be cast, into which the several collector rings and their connecting leads can therefore be embedded during the molding process. Teflon, a tetrafluoroethylene resin which can be cast or molded by known techniques, is particularly suitable for use in this assembly because its low-friction characteristic permits a very close fit between outer housing member 13 and inner shaft member 16, thus inhibiting leakage of the conductive liquid between the relatively rotating members, particularly in the case of mercury which has a large surface tension figure.

It should be apparent that the collector ring assembly described above can be modified as to materials and structure without departing from the basic principles of the present invention. For example, the outer housing and inner shaft members may be of composite structure, using a body material having good structural rigidity, providing insulation between the several collector rings, and facing the sliding surfaces with Teflon if desired. Single rather than dual apertures may be provided in the outer collector rings for filling purposes. Again, materials other than Teflon can be used with small clearances between the stationary and rotating members, for the surface tension of the mercury or other suitable conductive liquid tends to confine it within the annular recesses.

Obviously many modifications and variations of the present invention are thus possible in the light of the above teachings. It is therefore to be understood that within the scope of the appended claims the invention may be practiced otherwise than as specifically described.

What is claimed is:

1. An electrical collector assembly for use in establishing and maintaining electrical connections between stationary and rotatable components of electrical apparatus, said assembly comprising: rotor and stator members made of insulating material and mounted for relative angular displacement about an axis of rotation; said members having formed therebetween, for each said electrical connection, an annular channel for containing mercury and effectively sealed by closely fitted sliding surfaces against leakage of said mercury; mercury substantially filling each said channel; and connection means including conductive elements extending through the insulating material of each said member for making electrical contact with said mercury.

2. An assembly in accordance with claim 1, wherein one of said rotor and stator members is outermost, and wherein said outermost member is provided with sealable ports, one for each said channel, each said port communicating with its corresponding channel through a pair of adjacent filling and venting apertures.

References Cited in the file of this patent

UNITED STATES PATENTS 2,702,890  Hildebrandt _____ Feb. 22, 1955

FOREIGN PATENTS 149,372  Great Britain _____ Aug. 19, 1920